(12) United States Patent
Corrado

(10) Patent No.: US 8,508,079 B1
(45) Date of Patent: Aug. 13, 2013

(54) ENERGY CONSERVING CHARGER CONTROLLER, CIRCUITRY AND METHOD

(75) Inventor: Anhony P. Corrado, Nederland, CO (US)

(73) Assignee: Innovation Law Group, Ltd. (one-half interest), Sequim, WA (US)

( * ) Notice: Subject to any disclaimer, the term of this patent is extended or adjusted under 35 U.S.C. 154(b) by 859 days.

(21) Appl. No.: 12/344,508

(22) Filed: Dec. 27, 2008

Related U.S. Application Data

(60) Provisional application No. 61/009,462, filed on Dec. 28, 2007.

(51) Int. Cl.
  *H01H 83/00* (2006.01)
  *H01H 47/00* (2006.01)
  *H02H 3/00* (2006.01)

(52) U.S. Cl.
  USPC .......................................................... 307/131

(58) Field of Classification Search
  USPC .......................................................... 307/131
  See application file for complete search history.

(56) References Cited

U.S. PATENT DOCUMENTS

| | | | |
|---|---|---|---|
| 6,054,891 A * | 4/2000 | Christiansen | 327/438 |
| 6,642,909 B1 * | 11/2003 | Oliva | 345/1.3 |
| 7,332,834 B2 * | 2/2008 | Lee | 307/131 |
| 2006/0271800 A1 * | 11/2006 | Li et al. | 713/300 |
| 2010/0001590 A1 * | 1/2010 | Litwack | 307/131 |

OTHER PUBLICATIONS

"Electricity consumption by battery-powered consumer electronics: a household-level survey", J. Andrew McAllister and alexander E. Farrell, Energy & Resources, Grou, Univ. of California, 310 Barrows Hall, Berkeley, CA, 94720-3050, available online Sep. 28, 2006.
"Mains power systems", Wikipedia, http://en.wikipedia.org/wiki/List_of_countries_with_mains_power_plugs; Dec. 21, 2008.
"File: WorldMap Voltage&Frequency.png", Wikipedia, http://en.wikipedia.org/wiki/File:WorldMap_Voltage%26Frequency.png; Dec. 21, 2008.
"New Smart Power Strip", Gaiam Living catalog, Holiday 2008, gaiam.com, p. 52.
"Universal Smart Battery Charger and Conditioner", www.greenbatteries.com/unsmbachandc.html, Mar. 19, 2009.

(Continued)

*Primary Examiner* — Rexford Barnie
*Assistant Examiner* — Dru Parries
(74) *Attorney, Agent, or Firm* — Jacques M. Dulin, Esq.; Innovation Law Group, Ltd.

(57) ABSTRACT

An energy-conserving charger controller system, including charge sensing circuitry and operational algorithm, reduces parasitic lost energy by automatically "learning" the unique charging signature of a consumer electronic device (CED) battery to determine and sense when a it is being charged or not, and implementing conversion (from mains AC to DC) to occur only when a device needs charge. The inventive system employs a current measurement circuit, a microprocessor controller including a timing circuit and control algorithm code structure, a TRIAC current switch and an on-board battery. The inventive system and method is universal, being independent of the charger design, and may be an independent device upstream of the charger (between it and the mains power supply), integrated with an AC adapter charger unit, integrated into a CED, or part of a power strip for individually and independently controlling each AC adapter plugged into the strip.

16 Claims, 3 Drawing Sheets

THE INVENTION: Charger Controller System in Series with AC Adapter

(56) References Cited

OTHER PUBLICATIONS

"Xantrex XC Battery Chargers", http://www.donrowe.com/battery_charger/xc_batterychargers.html, Mar. 19, 2009.

"Software for PCs", http://www.1e.com/SoftwareProducts/NightWatchman/Index.aspx?gclid=CJifwMHirZkCFSQhDQodzEHClg, Mar. 19, 2009.

"Smart Power Strip'", http://bitsltd.net/index.php?option=com_content&view=article&id=49:new-smart-strip-models-coming-may-2008&catid=34:about-bits, Mar. 19, 2009.

"Smart Power Strip with person motion sensor", Isole IDP-3050 Plug Load Control, 8 Outlet Power Strip with Personal Sensor, $90, WattStopper/Legrand, http://www.wattstopper.com/products/details.html?id=74, User Reference Guide, 08956r Nov. 2007, Mar. 19, 2009.

"Battery Chargers and Energy Efficiency: Summary of Findings and Recommendations" Noah D. Horowitz, Project Manager and Editor, NRDC Sr. Scientist, Authors: Suzanne Foster, Chris Calwell, Travis Reeder, Riley Heugebauer of Ecos Consulting, pub by Natural Resources Defense Council, Aug. 2003.

* cited by examiner

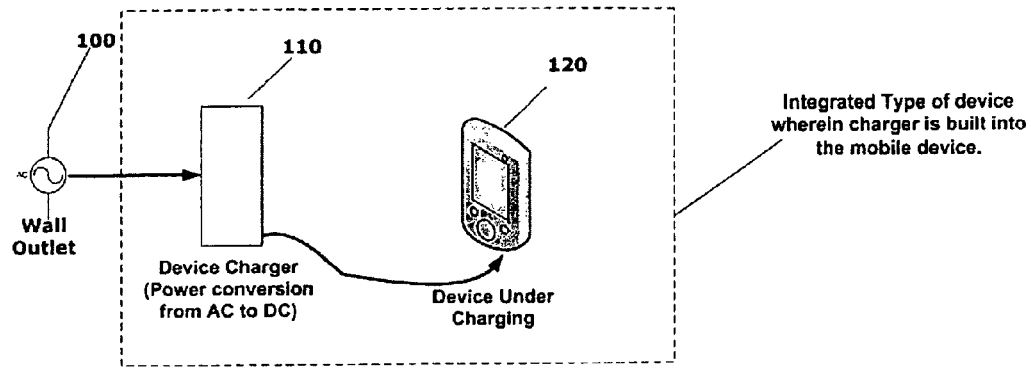
Figure 1: Prior Art System
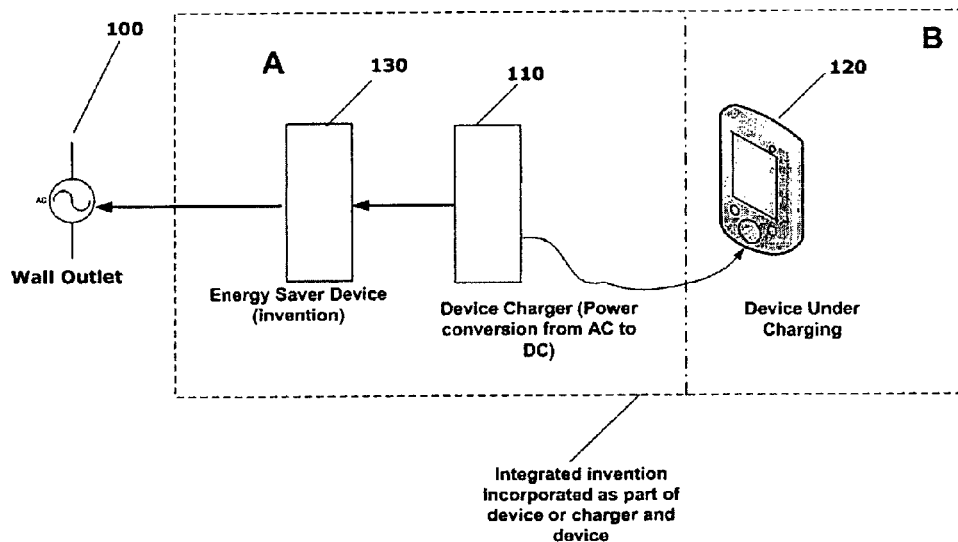
Fig. 2: THE INVENTION: Charger Controller System in Series with AC Adapter

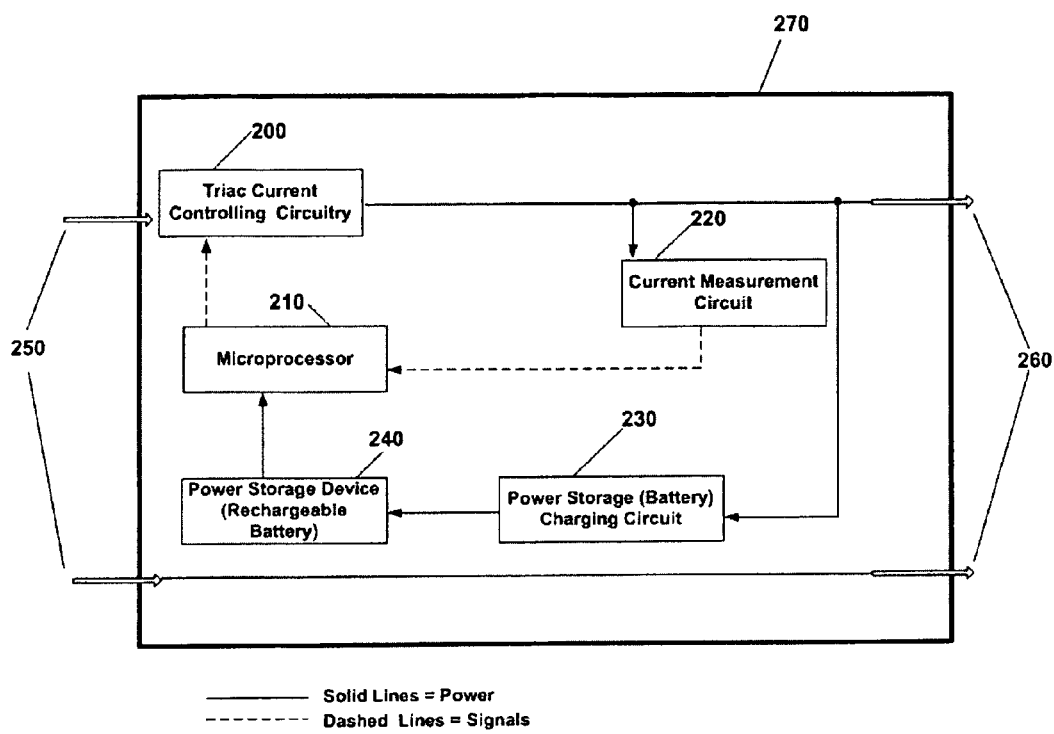
Fig. 3: Block Diagram of the Inventive Charger Controller System
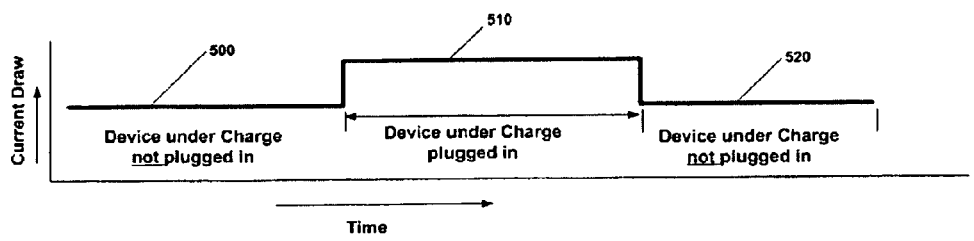
Fig. 4: Waveform of Prior Art AC Adapter Under Charging and Idle Modes

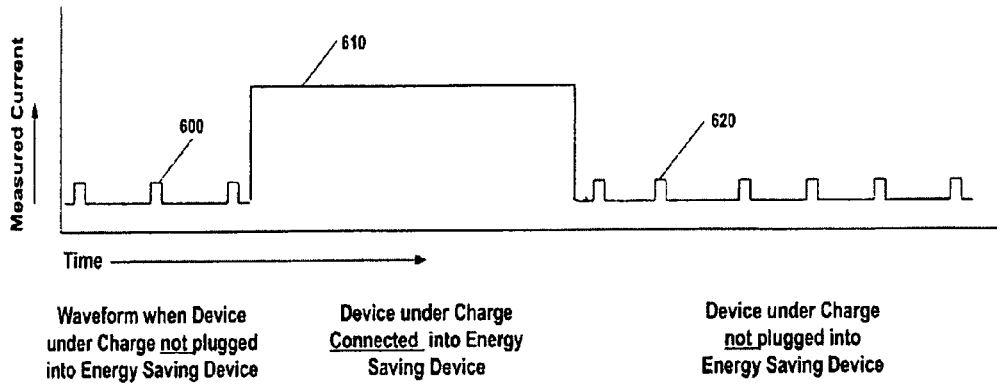
Figure 5A: Exemplary Waveforms of Timing and Measurement Functionality for Both the "Learning" and "Use" Mode of Operation of the Inventive Device
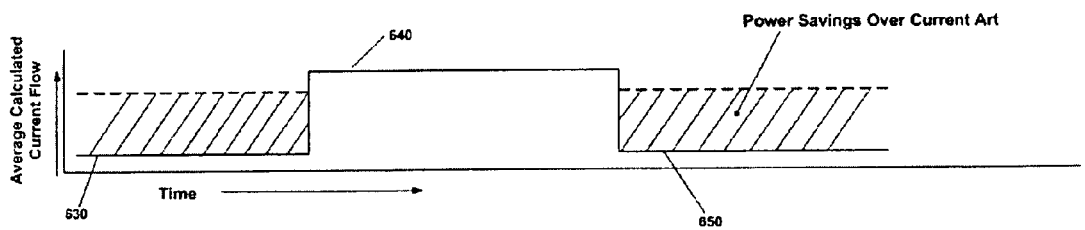
Figure 5B: Exemplary Waveforms Illustrating the Average Operational Energy Savings of the Inventive Controller System as Compared to the Prior Art

ENERGY CONSERVING CHARGER CONTROLLER, CIRCUITRY AND METHOD

CROSS-REFERENCE TO RELATED APPLICATION

This is the Regular US Application of Provisional Application Ser. No. 61/009,462 filed by the same inventor under the title "A method for effecting energy savings for devices that are used for charging other devices" on Dec. 30, 2007, the priority of which is claimed under 35 US Code Sections 119, 120 ff.

FIELD

The invention relates generally to the field of energy conservation, and more particularly to control devices, circuitry, including control algorithms, and methods that conserve energy when used in conjunction with transformer-type chargers and DC step down voltage devices employed for recharging batteries of mobile devices and other battery-powered devices, principally battery-powered consumer electronic devices (CEDs), such as but not limited to: cell phones, emergency/utility lights, power tools, RC vehicles, PDAs, portable computers (laptops and notebook computers), digital still and video cameras, rechargeable toothbrushes, cordless shavers, security systems, video players (DVDs, BlueRay Players, CDs), portable music players (CD, iPod-type players) and the like.

BACKGROUND

There are an estimated billion battery-powered consumer electronic devices (CEDs) in current use around the world, most of which are powered by rechargeable batteries. Charging systems for such devices comprise two main components: the power supply and the charging circuitry.

The power supply, also called a wall-pack or adapter, converts 240/120 AC mains or line power into low, 3-12 volt DC, and may be external to the device or internal, that is, on-board the device. The conventional power supply typically comprise a rectifier-type AC/DC adapter charger or converter, a linear or switched-mode power supply, or a transformer that is built into the top of a male plug or placed in line some distance between the wall plug end and the electronics device end of the power supply cord, the latter to rest on the floor. The most common power supplies contain an iron core linear transformer, which exhibits losses (output minus input) on the order of 40-70%. Newer types of switching power supplies are electronic, operate at high frequency, and generally have lower losses, but not negligible ones, than the linear type power supplies.

The charging circuitry portion of the recharger systems controls the current voltage provided by the power supply adapter to the CED battery. Charging control circuitry may be integrated with the power supply (such as power tool or vehicle battery chargers), or, more typically, internal to (on-board) the CED. The simplest control circuitry provides a constant charge to the battery and thus creates the possibility of relatively high parasitic losses if the user fails to unplug the device after an appropriate time. Thus, some walkie-talkies warn against leaving the handset continuously connected to the charger base unit when the handset is not in use. At the other extreme are sophisticated algorithms that continually tailor the charge to the battery's requirements, which can greatly reduce heating and other losses arising from overcharge. Newer battery chemistries, such as NiMH, Li-ion and Li-polymer, generally do not allow use of simple controller charging algorithms for reasons of safety and battery life, so their chargers include more complex algorithms, although there is still ample room for improvement. Regardless of the sophistication of the charging algorithm, the conversion from AC to DC power results in a constant power loss.

Such CEDs include, but are not limited to cell phones, emergency/utility lights, clip-on task lights, vehicle batteries, power tools, PDAs, portable computers (laptops and notebook computers), digital still and video cameras, rechargeable toothbrushes, cordless shavers, security systems, video players (DVDs, BlueRay Players, CDs), portable music players (CD, iPod-type players) and the like. Regardless of the precise class of rechargeable battery powered device, they are referred to herein generically as "consumer electronic devices" and "CEDs".

A World Map of Voltage and Frequency, found at http://en.wikipedia.org/wiki/File:World-Map_Voltage%Frquency.png shows the distribution of 220-240V 50/60 Hz and 110-127V 50/60 mains (domestic line) voltage throughout the world. Wikipedia also provides a list of countries with mains power systems and the various types of male plugs and female outlets at http://en.-wikipedia.org/wiki/List_-of_countries_with_mains_power_plugs,_voltages . . . .

Such charger devices are colloquially called "cubes", "bricks", "wall warts", "power bricks", "plug packs", "plug-in adapter", "AC adapters", "adapter block", "domestic mains adapter", "power adapter" and "chargers". The terms "AC adapter(s)", "charger(s)" and "AC adapter charger(s)" will be used generally herein, meaning both chargers and power converters, whether AC to DC or just voltage/current step down devices.

AC adapters typically include charging circuitry for the rectification or power transforming functionality. However, as noted, in many cases the charging circuitry is not part of the adapter/charger, but rather is incorporated into the mobile devices themselves. For purposes of this patent application the terms "charger", "controller" and "charging circuitry" are meant to cover both cases: either a complete mobile device with integrated charger, or a remote device that derives or draws power from a primary, mains/line source via an adapter and supplies battery charging DC power via an umbilical line or electrical power cord, slide contacts or the like, to the mobile device when the cord or AC adapter is plugged into the mobile device. That is, the charger control circuitry, including operational algorithm, may be integrated with the power supply in an adaptor "brick", or may be on-board the CED that carries the battery needing periodic, demand-based, recharging.

AC adapter chargers are normally plugged into primary mains/line electrical sources and utilize primary power on a continuous basis by virtue of their transformer to convert alternating current (AC) into direct current (DC). The transformers of these chargers are essentially "ON" 100% of the time as they remain connected to ("plugged into") primary mains/line power 24 hours per day for 365 days per year in order to be quickly available to convert 110/220 VAC into 3-12 VDC voltages in order to effect the recharging function of the batteries in the mobile devices. This energy is only usefully applied when a device requiring charge is attached, as this is the only condition in which energy is converted and utilized as opposed to being continuously wasted. Thus, conversion of AC to DC power consumes power 100% of the time due to heat and hysteresis losses whether a mobile or other rechargeable battery powered device is plugged into the recharger circuit or whether the device is removed for use.

When not charging the device battery, the conversion from AC to DC amounts to wasting energy. Reducing that waste energy consumption would contribute substantially to reducing global warming, as on the order of a billion such consumer electronic devices that use these chargers on a global scale.

The amount of waste electricity for stand-by of such AC adapter charging devices is staggering. In an article entitled "Electricity consumption by battery-powered consumer electronics: A household-level survey" by J. Andrew McAllister and Alexander E. Farrell, Energy & resources Group, University of California, Berkely Calif., available Online 28 Sep. 2006, the authors state in their Abstract:

"The rapid proliferation of battery-powered consumer electronics and their reliance on inefficient linear transformers has been suggested to be an important part of the rapid growth in "miscellaneous" [also called "parasitic"] electricity consumption in recent years, but detailed data are scarce [hence their research]. We conducted a survey of 34 randomly selected households (HHs) in Northern California about the number, type and usage of consumer electronics. We also measured the energy consumption of 85 typical consumer electronic devices through various parts of the charge cycle. These primary data were supplemented by national sales information for consumer electronics. Results indicate that typical HHs own 8.4 rechargeable devices, which have a total average demand of 12-17 W per HH. Statewide, this amounts to 160-220 MW of demand, with the peak occurring in the late evening, and about 1600 GWh per year. Only about 15% of this energy is used for battery charging, the rest is lost as waste heat during no-load and charge maintenance periods. Technical options to increase the efficiency of these devices, and the research and policy steps needed to realize these savings are discussed."

McAllister and Farrell estimate that in California alone, 100 million such devices were in use at the time of the research (2005). Thus, the continuous 160-220 MW demand, 1600 GigaWatt-hours per year waste power usage represents only some 35 million people. For the entire US or Europe, this translates to 16,000 GWh each annually, and, conservatively, over 200,000 GWh for the world. That is the output of some 200, multi-billion dollar power plants to satisfy the requirements of CED waste, through parasitic power loss while chargers are idle, waiting for battery-powered devices to be connected for recharging.

With respect to technical options to reduce wastage, the then-available McAllister-Farrell options were: timer-based approaches that turn off the charge circuit when appropriate, multi-stage chargers that dramatically reduce the charge current when the battery approaches full charge, and so-called "smart" chargers that use sophisticated charge algorithms to minimize overcharge and protect battery life. Smart chargers reduce flow of charge to the electronic device, but charger transformer losses still continue. However, such technical solutions have not become readily available, if at all. Further, consumers do not readily adapt-to or adopt a system that requires them to unplug devices such as cell phones when fully charged.

The second proposed main waste reduction approach was to improve power supply efficiency, including legislation for higher efficiency standards and governmental regulations imposed on external power supplies, such as the 2005 EU Code of Conduct. A "Smart Power Strip" offered in the GAIAM LIVING, Holiday 2008 catalog (gaiam.com) is described as employing "High-tech sensors [that] know when you shut down the main device [e.g., computer, TV, printer/scanner or VCR/cable box], and they cut off everything else. Although this publication is not prior art, it offers a relatively expensive ($39+SH&T) power strip device inserted between a transformer and the mains/line primary source.

Accordingly, there is an unmet need in the art for a paradigm shift in charger/adapter block architecture and functional charging circuitry, including algorithms, to provide a low cost, universal, easily manufactured devices that operate so that AC adapters charge only when a device having a battery needing a charge is plugged-in preventing otherwise-wasted, substantial parasitic power losses.

THE INVENTION

The inventive energy-conserving charger controller system, including charge sensing circuitry and operational algorithm, reduces parasitic lost energy by automatically "learning" a device's unique charging signature and subsequently sensing when a consumer electronic device (herein "CED") being charged is connected or not and implementing the transformer conversion (from AC to DC) to occur only when a device is connected to it, and its battery is below a learned, sensed charge level set point value. The inventive, power saving controller system and method is universal in that it works with a wide range of charge-requiring devices, being essentially independent of the charger design. It has the functional elements that provide capability of "learning" the charge cycle regardless of what type of charger or AC adapter is attached to it, or in which it is integrated, including so-called "smart" chargers.

The inventive controller device automatically "learns" the difference between a trans-former that is supplying battery recharge energy to a mobile device (in a "use" or "charging" power mode) and a transformer that is connected to primary power but which does not have an electronic device that is charging connected to it (a "non-use", "idle" or "no-load" power mode).

The inventive device may be used in connection with so-called "smart" chargers that sense the amount of charge of the battery being charged, and as the percentage of total capacity of the batter increases, reduces the charging current from the transformer. Such smart chargers have a charge maintenance mode, providing a trickle charge of the battery as it naturally discharges even when it is not in use, but connected to the charger. Thus, the inventive charge controller system can cyclically permit operation of a smart charger in the charge maintenance mode by an alternating "ON/OFF" mode. That is the inventive device shuts off the transformer when there is disconnect of the CED. When the CED is connected and the smart charger is in the trickle charge maintenance mode, the inventive device shuts down for extend periods, only turning ON to let the smart charger recharge the CED battery at the end of the period, but at current levels above typical trickle-charge micro-ampere levels. The result of the inventive ON/OFF cycling is that the heat and hysteresis loses that otherwise would occur, even in a smart charger, are eliminated.

In a primary embodiment, the inventive charger controller system is electrically up-stream of the AC adapter charger/transformer, and may be a physical, stand-alone device unit between an AC adapter/transformer and the mains power line outlet. Alternately, and preferably, it is integrated in the power supply brick or AC adapter device. In addition, it is an intermediate device, integrated into, or upstream of, AC adapter charger, and independent of whatever charging controllers and algorithms are resident (on-board), if any, the CED, but does not interfere with such CED on-board algorithms.

Thus, embodiments of the inventive controller system device are useful with any of the known and produced (conventional or commercially available) energy conversion chargers that are connected ("plugged into") or integrated with the inventive controller system device, rather than being directly connected to the primary power source. By providing an intermediate device, the invention can be used with all power conversion charger systems.

The inventive energy saving controller system device includes: a current control circuit; a microprocessor including a timing circuit and an operational control algorithm code structure; a digital current sensing circuit; and an integral, on-board power storage device (rechargeable battery, capacitor, super-capacitor, or replaceable battery); as part of its system components. The on-board battery operates the digital microprocessor circuitry, timer and algorithm of the inventive device when it does not sense the presence of a mobile or other CED undergoing recharge. When an AC adapter charger is plugged into the inventive device, the digital current sensing circuit detects the difference in current consumption, and triggers the primary mains power to be applied to the AC adapter charger, and thence to the CED's battery being charged, on a continuous basis until a learned high charge level state is reached. When the device undergoing recharge is unplugged (removed/disconnected) from the charger or the high charge level state is reached, the energy saving device senses the reduced current draw, and immediately triggers the This power saving mode disables the energy conversion by switching the primary source supply "OFF".

The digital current control circuitry of the inventive device is under microprocessor control. The microprocessor generates the timing events required, by means of internal clocking components, such as an oscillator and counting register, to generate factory-selectable event timing for use within the embedded, programmable control algorithm(s). Such timing events control "sleep" period lengths and sampling pulse(s) frequency (periodicity) of the inventive de-vice. Once the primary source supply is switched OFF, the inventive device enters a "reduced, on-board powered" sleep state, in which the microprocessor is powered by the incorporated on-board power storage unit (battery). After a pre-selected, preset time has elapsed, in the exemplary implementation, a time period of fifteen minutes (factory selectable from seconds to minutes or hours), the microprocessor awakens to its full power state, senses the AC adapter power draw level (connected/not connected), and if a CED battery is connected, enables primary power current to be applied to the CED battery being recharged. The inventive device utilizes the first 2-10 charging cycles to "learn" the difference between a CED battery "requiring charge" mode, or condition, versus an "idle", or "charged" mode, or condition.

By "requiring charge" mode is meant the battery of the CED is presenting a load state of accepting a full charge rate. By "idle" mode is meant the CED battery is at or around (approaching or somewhat over) a selected set point percentage of its full charge, e.g., 90%-95% of its full charge state. The inventive system does not do a conventional, micro-amp, continuous trickle charge, since trickle charge continues to waste power. Rather the inventive system shuts the AC adapter/charger down by cutting off mains power to it so that there is zero power consumption by the AC adapter. Then when the battery charge condition drops below the same or a different pre-selected set point, e.g., 50%-90% of its full charge, the inventive controller system turns the charger back on by switching on the mains power so that the charger begins to charge the battery again. Thus the inventive system cycles ON/OFF between multiple (e.g., two) set points, or around a single set point. Maintenance charging is provided by the inventive device in an ON/OFF cycling mode, typically a higher current when ON, than conventional trickle chargers.

If the current draw exceeds a learned "baseline" level of current usage, (which baseline level is indicative of no device under recharge being connected), then the microprocessor-con-trolled digital circuitry of the inventive charger controller device will enable full power to be converted and applied to the device undergoing recharge by tripping the mains power ON to the AC adapter charger. That is, if the base-line level is exceeded, then a device needing to be charged must be connected to the AC adapter charger. Stated another way, when the detected value of power consumption is representative of the "learned" value of a recharging state in which a device is undergoing recharge, then the inventive device enables full mains power to be applied.

Conversely, when the inventive charger controller device measures the value of power consumption to be commensurate with (equal or below) the learned baseline level, then the device microprocessor enters, or re-enters as the case may be, the hibernation (sleep) state until the preset period of time elapses, after which it again transitions to full power, samples the current draw by the AC adapter charger to determine whether the baseline set-point is exceeded. If so, meaning a mobile device is connected, it turns ON the mains power, and if not it reenters the preset hiber-nation period. The inventive energy saving charger controller device continues this process of operation indefinitely.

The incorporated on-board microprocessor power supply battery is recharged whenever the consumer electronic device is being charged. Alternately, the inventive charger controller circuitry can monitor its own battery charge level, and if it falls below a preset level, turn mains power ON for a short time to recharge its own battery, and OFF when the battery reaches a defined level of charge. These ON/OFF set points are typically in the range of 50-70% of battery charge level for triggering "turn mains power ON", and 90-95% for triggering "turn mains power OFF".

The energy saving is immense. It equals the difference between full power on continuously for the AC to DC conversion and the greatly reduced "full power consumptive" state existing when a consumer electronic device is not connected for recharging.

BRIEF DESCRIPTION OF THE DRAWINGS

The invention is described below in more detail by reference to the drawings in which:

FIG. 1 is a schematic diagram showing the present conventional (prior art) AC device charger set-up drawing power from a mains/line wall outlet and providing charging DC to a consumer electronics device, an MP-3 player being shown by way of example;

FIG. 2 is a schematic diagram showing the inventive energy saver device interposed between the AC device charger and the wall outlet;

FIG. 3 is a block diagram of the circuitry of the inventive charger controller device;

FIG. 4 is a graphical representation of current draw vs time of a prior art AC charger illustrating the power usage as a CED is plugged in or not;

FIG. 5A is a graphical representation of exemplary waveforms illustrating timing and measurement functionality for both the "learning" and "use" mode of operation of the inventive device; and FIG. 5B is a graphical representation of exemplary waveforms illustrating the average energy savings of the ON/OFF sensed switching mode of operation of the inventive device.

DETAILED DESCRIPTION, INCLUDING THE PRESENT BEST MODE OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

FIG. 1 is an exemplary system illustrating the typical elements of currently available prior art AC charger system set-up to recharge devices such as cell phones, computers and other handheld devices. A wall outlet, 100, is illustrated as supplying primary mains/line AC power to the charger device, 110, which is plugged into the wall outlet and via umbilical line to a CED 120 that requires recharging. The primary power is typically, but not restricted to, 110/220 VAC. The intermediate device 110 is the AC adapter charger. This device converts the 110/220 volts alternating current to the appropriate level of direct current (transformer and rectifier circuits) matched to the requirements of the CED, 120, under-going recharge. It must be noted that in some cases the charger is built into (integrated into) the mobile device; this is illustrated by the dashed line box around the charger and the CED. In that example, the charger provides proper levels of DC power without the umbilical line.

It is important to note that these prior art AC adapter chargers are dedicated, whether integrated or not, in that each CED requires the proper pin polarity and proper input of DC voltage and current. Who doesn't have a shoe-box full of AC chargers that are orphans, that is, they are left-overs from lost or broken CEDs, and there is no identification for which CED they may be the proper AC charger? Thus, AC chargers tend to proliferate, another source of wasted resources.

With reference to FIG. 1, the elements comprising the conventional methodology of effecting a recharging of the batteries on portable devices such as cell phones, tools, toothbrushes, laptop and notebook computers or PDAs, 120, is illustrated. Typically a charger, 110, is supplied or required as an adjunctive part of the mobile device. This charger is typically plugged into standard wall outlets where primary power is supplied. (Note: it is possible that a DC source of power is directly applied in which case the invention is still applicable without the power conversion.) These chargers generally consist of a transformer and power conversion circuitry wherein the primary alternating current power source, 100, is converted to the device applicable direct current source at the proper voltage levels. These chargers are generally capable of using either 110 VAC or 220 VAC sources. These primary power plug sources are illustrated as item 100 in FIG. 1. When used in the manner shown, the chargers, 110, are constantly converting power from AC to DC even when no device is, 120, is plugged in. Such power is converted to heat, hysteresis, and other energy losses.

FIG. 2 illustrates a first embodiment of the inventive AC adapter charger controller system in which the inventive system is provided in the form of an intermediate energy saving controller device, 130, connected upstream in series with the charger, 110. The inventive controller device periodically senses and controls the AC mains current from the outlet 100 to the charger, 110. The inventive controller device, 130, measures the current being consumed by the CEDs undergoing recharge, such as cell phones, computers and other handheld devices. The inventive controller device, 130, can be a standalone device into which chargers, 110, are plugged as shown in FIG. 2, or its functionality can be incorporated into the AC chargers, 110 as an integral part thereof as shown by the dashed-line box A. This latter is the preferred embodiment for new AC chargers, while the standalone charger device 130 shown in FIG. 2 is the preferred embodiment for retrofit usage with the billion or so present chargers in use in house-holds and business settings. Alternatively, the inventive AC adapter controller device may be incorporated with the AC adapter into the CED; this is illustrated by the boxes A+B of FIG. 2.

FIG. 3 is an exemplary block diagram of the control circuitry of the inventive device, 130. It is not a circuit schematic, as those skilled in the art will readily be able to build the inventive device from the block diagram, and recognize that it is straight-forward to implement a wide range of variations in electronic components while enabling the functionality shown and described. Accordingly, the essential inventive elements shown in the FIG. 3 block diagram perform the following functions. The primary power supply connection, 250, is shown as supplying primary power (both a hot and a ground line) to the device, 130, for AC power. This power supply is typically 110/220 VAC and the connection is typically implemented as a device "plug". A current control circuit, 200, employing by way of example a bidirectional triode thyristor for low power applications and two silicon-controlled rectifiers connected in inverse parallel relationship for higher power applications, is incorporated as a ON/OFF switch to either enable or disable current to pass thru the energy saving device, 130, from connectors, 250, to the charger connected at 260. An example of the bidirectional triode thyristor that may be used is a TRIAC (TRIode for Alternating Current) which is an electronic component equivalent to two silicon-controlled rectifiers (SRCs/thyristors) joined in inverse parallel relationship, that is, in parallel but with reversed polarity, and with a common gate. This results in a bidirectional electronic switch can conduct current in either direction when it is triggered (turned ON) by either a positive or negative voltage applied to the gate electrode. Once triggered, the TRIAC component continues to conduct until the current through it drops below a certain threshold value that is native to the particular TRIAC used. Thus, by selecting the TRIAC, the inventive controller circuit 200 permits control of relatively large power flow with milliampere-scale control currents. In addition, the microprocessor of the inventive system, by applying a trigger pulse at a selected point in an AC cycle, permits control of the percentage of current that flows through the TRIAC to the load, here the AC adapter charger, accomplishing phase control.

The inventive controller device functionality is controlled by a microprocessor, 210. The microprocessor is powered by a backup power storage device (in the exemplary invention a rechargeable battery), 240, enabling it to function when the primary power supply is disabled. Note: the backup power storage source, 240, can be replaceable batteries, rechargeable batteries or super-capacitors. The battery is recharged by a built in charging circuit, 230 whereas the capacitor would be recharged via a simple trickle charge from the device charging circuit.

The microprocessor, 210, supplies a signal (dashed line) to the current control circuit, 200, periodically enabling current to flow through the inventive controller device via connections 250 and 260. If the instantaneous current draw as measured by circuit 220 is indicative of a value commensurate of a device not being connected on the power output leads, 260, then the entire energy flow through device 130 is shut down. This value is stored as a baseline, learned value in the microprocessor 210. If the instantaneous current draw as measured by current measuring circuit 220 is indicative of a value commensurate with a device being connected on the power output leads, 260, then the power TRIAC 200 enables full power to flow through to the AC adapter charger plugged into the outlet 260. When power is enabled it also is used to recharge the energy storage device (battery or super-capacitor), 240. This is accomplished thru a battery charging sub-circuit 230 incorporated as part of the inventive controller device 130. All of this circuitry is housed in a plastic enclosure 270.

With reference to FIG. 3, the rechargeable battery, 240, incorporated as part of the energy saving device system, is primarily used when the device primary power supply, 250, is blocked (current flow turned off) by the current-controlling circuitry 200. In an alternate embodiment of the invention, when the microprocessor enables power 250 to be supplied to the charger, 110 plugged into outlet 260, the microprocessor may derive its power from that primary power, 250, thru an AC/DC converter (not shown but disposed connected to the output of circuit 200 and inputting power to microprocessor 210). That converted can supply the microprocessor with DC power of the correct voltage.

The battery, 240, is maintained at full charge from the integral battery charging circuit, 230. The battery, 240, is a necessary element as the microprocessor must be processing both timing and measurement functions on a predetermined cyclic basis when the primary power is disabled. It should be noted that the battery element, 240, can be replaced by other energy storage devices such as capacitors, and the system will function properly.

The TRIAC/Inverse SRC-implemented current-controlling circuitry, 200, effectively terminates (cuts off) any power, 250, from passing through or into the energy saving device, 130, unless a signal from the microprocessor, 210, is present. When this signal is present, the primary power is turned ON, that is, allowed to flow thru the inventive controller device and into the primary power outlet, 260, supplying power to a charger, 110, when one is present. Whenever power is applied thru the current-controlling diode circuitry, 200, the actual amount of DC current that is flowing is measured by the current measurement circuit, 220. This circuitry measures the voltage drop across a resistive element, such voltage drop being proportional to the amount of current flowing thru the sub-element, current measuring circuit 220. If a CED AC adapter charger is connected across the power connections, 260, then the voltage drop across element 220 is higher than when no charger 110 is present.

The inventive charger controller devices can be manufactured with output capability of supplying limited amounts of power, or with a very high amount of power throughput. Typical of a low power usage controller would be cell phones, while tool battery chargers would be examples of high power consumption devices.

FIG. 4 is an exemplary representation of a typical power usage profile of the prior art commercially available AC adapter chargers in current use in which the power consumption is shown illustratively as a function of time. Note: The vertical axis is illustrated as current draw which is proportional to voltage drop and proportional to overall power/energy consumption. This figure is to be compared to FIG. 5B. In this example, the current draw of the AC adapter transforming device (charger) 110 is shown as a stepped horizontal line axis parallel to the Time axis. In this figure, the current (power) being consumed by the charger when no device is attached is shown as item 500. There is a level of power consumption 500 well above zero, even when no device is being charged. When a device is plugged into the charger 110, the energy (current) being consumed rises as more energy is being converted into DC voltage to effect recharging of the device 120. This increased level of current consumption is shown as item 510. When the device is either fully charged, or removed from the charger 110, then the level of current consumption will fall from 520 to a level at or close to level 500. This value, 520, may differ from the value 500 as the current usage may represent a connected but fully charged device as opposed to a disconnected device. The 500 line represents an elevated baseline (idle) power loss in the prior art AC adapter charger devices.

In the exemplary system, the time can be a few seconds or it can extend for days, depending on the "learning" and "use" mode of the energy saving device 130.

The learning and use modes of operation of the inventive device are illustrated with reference to FIGS. 3 and 5A. The microprocessor, 210, will periodically enable current flow thru diode circuitry, 200. The periodicity of this action and the time duration are determined as functions of the device 120, being charged. The inventive charger controller, energy saving device, 130, effectively "learns" the characteristics of the CEDs 120 being charged, in the following manner.

The energy saving device has a "learn" mode as well as a "use" mode algorithm embedded in firmware in the microprocessor. The "learn" mode is automatic and is initiated with the first application of power applied to the energy saving device. When the energy saving device is first energized, the period of each pulse, 600, is constant, or full time. The microprocessor will measure the current draw and calculate the average power consumption and enter such data into a history database file, for comparison purposes. In this "first use" or "start-up" mode, the inventive controller device will enable full power to be applied 100% of the time without blocking by the current controlling circuitry, 200. Since it is not known whether a charger is connected at this time, the constant application of power is enabled.

The current draw profile in that initial, learning mode of the inventive device is similar to that shown in FIG. 4B. Thus, FIG. 4 represents the continuous operation mode for a prior art device, and the initial, limited, learning operation of the inventive device.

The microprocessor samples the voltage drop across element 220 periodically. It continues to sample and record this value until a change is noted. With reference to FIG. 5B, the change can be either positive or negative in relative value depending on whether a charger was connected at the first application of power, e.g., started at current level 510, or whether it started in an idle state, current level 500, and a charger was connected after this initial period of operation.

The inventive device continues to sample the current by circuit element 220, for at a minimum of three cycles of energy consumption changes. The microprocessor monitors this consumption level until such time as the consumption either increases (indicative of a charging load being applied) or decreases (indicative of a charging device being removed). The energy saving device will record (data log) both conditions of minimum and maximum power consumption. This is the "learning mode" of the energy saving device. If the energy saving device entered the initial sampling mode with a device connected to it, current draw level 510, then the current draw will be lower when the device is removed, 500.

When a selected, predetermined number of such cycles has occurred, for instance 2 or more, a control algorithm embodied in the microprocessor selects the lower value 500 of power consumption, as representative of the condition when a unit being charged is not connected to the inventive device. It further evaluates (selects) the higher value of power consumption 510, representative of when a CED being charged is connected to the inventive device via an AC adapter charger (110 in FIG. 2). These high and low load draw values are preferably averaged and saved to the memory structure as high and low set points. The condition illustrated as 520 in FIG. 4 is shown as being identical or slightly different than 500 as these values can vary slightly. The learning algorithm will calculate this variability in determining both high and low consumption states, typically selecting an average of the lower and higher levels as the set-points for switching in TRIAC 200.

FIG. 5A is an exemplary representation of the current consumption over time with the inventive energy saving 130 device being utilized. The waveform 600 is an example of the periodic sampling in which the current draw is measured. When a device is plugged in for charging the current draw rises as shown in item 610. Upon removal of the device under charging the current draw falls again as shown in item 620. FIG. 5B, illustrates these three events as a representation of the average current (power) under these periods. Item 630 is the average cur-rent consumption without a device being charged. Item 640 is the average current consumption with a device under charging and item 650 is the power consumption of the device without a device being charged. It should be understood that the current of line 600 is lower that for 500, and in the former case, the inventive device has shut off the current to the AC adapter charger 110, so that there is no draw for power loss.

With reference to FIG. 5A, upon this determination, the inventive algorithm will enter a "use" mode. In the "use" mode, the microprocessor periodically awakens for short time periods, switching under power from the battery 240 (FIG. 3) to permit power to flow from the mains 100. As noted above, the microprocessor generates the timing events required by means of internal clocking methods such as an oscillator and counting register, to generate factory selectable event timing for use within the various algorithms. Such timing events control the "sleep" period and sampling pulses 600 and 620 of FIG. 5B, and the period between "awaken" commands for the purpose of sampling AC adapter draw is on the order of from about 1 to about 15 minutes, but can range from seconds to hours, depending on the AC adapter type and other discerned requirements. The sampling "event" or pulse duration is on the order of milliseconds.

Such sampling pulses are shown as spikes in line 600. During these brief periods, the average current consumption is measured by circuit 220 and the value signaled to the microprocessor 210. If the consumption is close to the lower value obtained during the "learning mode", then the microprocessor signals the TRIAC 200 to immediately terminate the current flow. Pursuant to the embedded algorithm, the microprocessor then waits for another detection period to occur at which time this process is repeated. These periods are pre-selected, and can be quite long, as there is not a critical time for immediate device charging. Typically these periods are set to be from several seconds to several minutes, i.e. 15-30 minutes.

During one of these detection events the power consumption will be commensurate with that which was "learned" and associated with a device connected to the charger. Under this condition the inventive controller device will supply full power so that the charging process can be completed. The level of power consumption, 610, is confirmed by the periodic current measurement checks even during charging. That is, the cyclic power draw checking (power sampling) is a substantially continuous process. However, the cycle times between current draw measurements when a low draw (unplugged CED) condition is detected may be different than when the AC adapter charger is drawing full power to charge the CED battery. When the power level 610, decreases 620, the inventive device once again switches to the energy conservation mode of operation. The microprocessor continues to sample on a periodic basis, calculating and storing the values of the average power being consumed.

In addition to the determination of binary power level changes, the embedded controller algorithm also calculates the slope of power consumption and will "learn" the values that are representative of the energy consumption being near maximum. The ability to terminate the AC power at, for instance, 90% of the device under charge total battery energy can be utilized to save additional energy since most efficiency of battery charging are realized from 0-90% of a battery's maximum charge capacity.

Accordingly, with respect to the algorithm and the method aspects of the invention, the algorithm includes program coding for the following functional steps to be carried out by the microprocessor, which algorithm is embedded in the microprocessor operating memory:

Sequence of Encoded Algorithm Processing Steps

1. When primary power is first applied, the microprocessor enables full power thru the TRIAC to the CED battery under charge. Note: the inventive controller device will operate in a prolonged period of "sleep" mode when its on-board battery 240 is first enabled (connected). However, the inventive device will not enter the "learning" mode until it has a current draw that exceeds a minimum factory set level as no current draw will be present until it is connected to a source of primary power;
2. Microprocessor (algorithm code instruction set) evaluates measured current draw until a step change in current draw is detected (either low charge rate state to high charge state rate or high charge rate state to low charge rate state);
3. Microprocessor writes the two state levels (high current and low current draw) to temporary memory storage;
4. Microprocessor repeats steps 1-3 for a pre-selected, N-number of cycles, e.g., from 2 to about 10 cycles;
5. Microprocessor calculates average of high charge rate state (learned level A) and low rate state (learned level B);

6. Microprocessor writes (saves) the "learned" state levels (i.e. A & B) to a separate memory structure of the microprocessor (stores them in a learned state database) as high and low set points;
7. Microprocessor enters a sleep mode wherein it only checks current draw on a periodic basis (FIG. 5A) to determine if Level A or B is present. In this "sleep" mode the mains power is turned on periodically for very short time periods to ascertain whether the current draw levels are one of the two "learned" states;
   i) If a high current state (level A) is determined, inventive controller device enables full power under constant microprocessor monitoring to determine when the invention reaches the low current draw state;
   ii) When the low current state (B) is determined the Microprocessor turns primary power OFF (interrupts mains power) and re-enters "sleep" mode;
8. If during step 7 above, the microprocessor determines that the current draw is representative of neither learned level A or level B high or low set points, then steps 1-5 are repeated and a new set of levels, e.g., level C and level D set points, are determined and set into memory per steps 5&6. This condition could represent that the charger is used for one or more different devices undergoing charging, or that a different AC adapter charger is plugged into the inventive device AC outlet;
9. During step 7, the measured current draw is now compared to the pre-selected, N-number, of stored-in-memory states, and where the low set point is met or exceeded, the microprocessor triggers the current control circuit to permit mains current to flow, thereby enabling charging of the "new" CED per step 7.

Accordingly, the inventive charger controller system is smart enough to distinguish between different AC adapter chargers or CED batteries, and apply the correct triggering signals to the TRIAC. Thus, the microprocessor control algorithm can be programmed to match "high" and "low" AC adapter charger "draw" loads trigger set points to several different AC adapter chargers such that the inventive charger controller system can be used for multiple different chargers or CEDs plugged into it. The inventive device, through the programmable "ON/OFF" cycling functionality of its control algorithm, can be set to enable mains power flow to the AC adapter and CED for a limited time period, whenever the monitored (sensed) AC adapter draw represents a partially discharged CED battery (e.g., a 50-70% range, or such other preselected range), to bring the battery back to substantially full charge, which ON/OFF full power cycling functionality is effectively a power-saving type of trickle charge, yet the AC adapter is not "Always-ON".

With reference to FIG. 5B, the waveform 630 represents the average calculated power consumption over the sampling periods when no CED device is being charged, 640 represents the average power consumption when a CED device is undergoing recharging and 650 represents the average power consumption when the CED device undergoing recharging is either removed or fully charged. The dashed line above 630 and 650 represents the average draw of a prior art AC adapter charger, which is substantially higher than when power is turned off to such chargers. The lined area between the dashed and solid lines 630 and 650 represents wasted energy that is consumed by the prior art AC adapter chargers. It is evident that the power saving levels 630, 650 provided by the inventive controller device, circuitry and operational algorithm is far lower than the prior art, and the lined area (difference as compared to the prior art) represents a very substantial energy savings. Such energy saving represents the contribution to global warming and associated energy costs by the uncontrolled prior art devices.

The inventive controller device can be integrated into a multi-AC outlet power strip. The microprocessor controller learning algorithm code structure and memory permits selective learning of each AC adapter plugged into the various outlets of the power strip, and stores the average charge state levels (A and B) for each as the unique high/low set points for each AC adapter. Thus, the inventive microprocessor can selectively recognize and trigger the current control TRIAC to enable or interrupt mains power individually and selectively for each unique AC adapter. This functionality is distinct from an "all-ON or all-OFF" type of power strip control, and permits some of the CEDs or other devices to remain plugged into the power strip to be operable. An example would be a light, security system, back-up drive or the like.

INDUSTRIAL APPLICABILITY

Clearly the inventive AC adapter charger controller device, circuitry and operational algorithm will become the standard in the industry for reducing parasitic power losses by AC adapter charger devices, whether stand alone, retrofit, or integrated modules, or in power strips.

It should be understood that various modifications within the scope of this invention can be made by one of ordinary skill in the art without departing from the spirit thereof and without undue experimentation. For example, the sampling period and frequency can be varied depending on the type of AC adapter charger being used, e.g., the sampling period may be different for a cell phone charger than a power tool charger. This invention is therefore to be defined by the scope of the appended claims as broadly as the prior art will permit, and in view of the specification if need be, including a full range of current and future equivalents thereof.

The invention claimed is:

1. A charger controller system for use with AC/DC adapter charger devices for recharging batteries of consumer electronic devices, which AC/DC adapter chargers are stand-alone or integrated with said consumer electronic devices (CEDs), comprising in operative combination:
   a) a current controlling circuit element in series with, and intermediate between, a mains AC supply of power and an AC output for an AC/DC adapter device having a DC output for providing charging current to a CED connected to said AC/DC adapter;
   b) a current measuring circuit element connected downstream of said current controlling circuit element for measuring the current flow to said AC output and assessing the CED battery charge state;
   c) a microprocessor having leads connected to said current measurement circuit for receiving signals from said current measurement circuit representative of current draw on said AC output and said CED battery charge state, said microprocessor having a programmable control algorithm code structure;
   d) said microprocessor control algorithm code is structured to periodically assess the charge state of said CED battery and responsive thereto, to provide trigger signals to said current controlling circuit to enable, switch ON, or interrupt, turn OFF, flow of mains AC current to said AC output in response to the rate of current draw assessed charge state of said CED battery, said control algorithm code is structured to learn the measured charging load cycle of a CED battery which is connected to said AC/DC adapter DC output, and to provide, switch ON, full mains AC current to said AC output when said CED battery charge state requires charging power, turn OFF mains AC current to said AC output when said CED battery is no longer present or said CED battery charge state no longer requires charging power being in a trickle-charge maintenance mode, maintains said mains AC current OFF to prevent trickle-charge, and turns mains AC current ON again once the charge state of said CED battery is assessed as requiring full charging current;

e) a power storage device connected to said microprocessor to provide power to said microprocessor when mains power is absent; and f) said system providing substantial energy savings as compared to uncontrolled AC adapter charger devices by preventing charger hysteresis and heat energy losses when said consumer electronic devices are not connected to otherwise uncontrolled AC adapter charger devices or the batteries of said CEDs are substantially fully charged or in a trickle-charge maintenance mode.

2. A charger controller system as in claim 1 wherein said power storage device is a rechargeable battery or super-capacitor, and said system includes a battery charging circuit powered by said mains power.

3. A charger controller system as in claim 1 wherein said current controlling circuit includes a current control element selected from a bidirectional triode thyristor and silicon-controlled rectifiers in inverse parallel orientation.

4. A charger controller system as in claim 1 wherein said control algorithm code is structured to periodically awaken said microprocessor from a sleep state in which said mains power to said AC outlet has been interrupted, trigger said current control circuit element to enable said mains power to flow to said AC outlet, check the value of the measured current flow as sensed by said current measurement circuit, and if the measured current corresponds to a value representative of when a CED battery is connected to and being charged by a connected AC/DC adapter charger, permit said mains power to flow uninterrupted, and if the measured current corresponds to a value representative of when a CED battery is not being charged by a connected AC/DC adapter charger or is in a trickle charge maintenance mode, interrupt said mains power and return to a sleep state for a pre-selected time period.

5. A charger controller system as in claim 4 which is configured as a stand alone device, including a male prong assembly for plugging said device into a mains power outlet, and a female outlet configured to receive the male prong assembly of an AC/DC adapter charger.

6. A charger controller system as in claim 4 which is integrated with at least one of an AC adapter charger device and a CED having onboard AC/DC adapter charger elements.

7. A microprocessor for controlling flow of current to an AC load, said micro-processor being interposed between said load and an AC mains power supply line, comprising:
   a) a circuit including:
      i) a low power input;
      ii) at least one measured current draw signal input;
      iii) a trigger signal output;
      iv) a clock;
      v) a memory structure; and
      vi) a control algorithm having a programmable code structure which causes said microprocessor to selectively output trigger signals to a current control circuit element in accord with the functional events of: periodically awakening said microprocessor from a sleep state in which said mains power to said AC load has been interrupted, triggering said current control circuit element to enable said mains power to flow to said AC load, checking the value of the measured mains power current draw signal input, and if the measured current corresponds to a value representative of when a load is present and drawing mains power, permits said mains power to flow uninterrupted, and if the measured current draw signal input corresponds to a value representative of when a load is not present or drawing current representative of trickle-charge maintenance mode of said AC load, interrupts said mains power and returns to a sleep mode.

8. A microprocessor as in claim 7 wherein said control algorithm includes programmable code structure to cause said microprocessor to selectively output trigger signals in accord with the functional events of:
   a) detecting an initial application of mains power current draw by said load;
   b) triggering full power to said load;
   c) periodically evaluating current draw until a first step change in current draw is detected, said step change being selected from a low load draw to a high load draw, and a high load draw to a low load draw;
   d) continuing to periodically evaluate said current draw until a second said step change in current draw is detected, said first and second step change comprising a cycle of step change;
   e) writing said first and said second step changes as two state levels corresponding to high current state level and low current state level to said memory structure in said microprocessor;
   f) continuing to periodically evaluate said current draw to detected a pre-selected, N-number of said cycles of step changes;
   g) calculating the average of the high current and low current state levels;
   h) storing said average state levels as learned state levels, high and low set points in a database structure of said microprocessor;
   i) after said N-number of cycles, entering said microprocessor into a reduced power, sleep mode, during which the microprocessor is awakened in accord with a timing signal from said microprocessor clock, to sample the current draw; and
   j) where said sampled current draw equals or exceeds said high set point returning to said sleep state, and where said sampled current draw equals or is below said low set point, providing a trigger signal to enable mains power to flow.

9. A microprocessor as in claim 8 wherein said pre-selected N-number of cycles ranges from 2 to about 10.

10. A microprocessor as in claim 9 wherein said current draw sampling occurs at periods in the range of from about 1 to about 15 minutes.

11. A method of conserving electrical energy by reducing the loss of electrical energy by an AC adapter charger connected to a mains line power supply for recharging a CED battery when said CED battery is either not connected to said charger or at or near the full charge capacity of said battery, whether said AC adapter charger is stand alone or integrated with said CED, comprising the steps of:
   a) automatically monitoring the draw of current of said AC adapter charger by periodic awakening of a battery-powered microprocessor having control algorithm code structure that cyclically evaluates measured current draw until a step change in current draw is detected, either from a low charge rate state to high charge rate or high charge rate state to low charge rate state;

b) permitting current to flow from said mains line power supply to said AC adapter charger when said monitored current draw step change is representative of charging load current draw on said AC adapter charger;

c) automatically interrupting current flow from said mains line to said AC adapter charger so that there is zero mains current flow, when said current draw step change is monitored to be representative of substantial absence of charging load on said AC adapter as when said CED battery is not connected or is in a trickle charge maintenance mode;

d) permitting said microprocessor to revert to a sleep mode after a preselected number of cyclic evaluations of step change from high charge rate state to low charge rate state; and e) reducing parasitic hysteresis and heat electrical energy loss, in an amount being substantially the difference between said zero current flow and flow to said AC adapter charger when it is connected to mains yet there is no CED battery being charged or said CED battery is in a trickle charge maintenance mode.

12. An electrical energy conservation method as in claim 11 applied to operation of a charger controller device having a bidirectional triode thyristor controlling circuit, a current measurement circuit, a microprocessor having a timer and a programmable control algorithm code structure, and a battery for providing power to said microprocessor during sleep periods, which includes the steps of:

a) when primary power is first applied, the microprocessor enables full power thru the bidirectional triode thyristor to said CED battery under charge; said microprocessor operating in a prolonged period of "sleep" mode under power from its battery, entering a "learning" mode upon detection of a current draw that exceeds a minimum factory set level as no mains current draw is present until it is connected to a source of mains primary power;

b) said microprocessor control algorithm code structure includes at least one instruction set for evaluating measured current draw until said step change in current draw is detected, either from a low charge rate state to high charge rate or high charge rate state to low charge rate state;

c) said microprocessor writes the said two state levels, high current and low current draw, to temporary memory storage;

d) said microprocessor repast steps a)-c) for 2-10 cycles;

e) said microprocessor calculates average of high charge rate state, learned level A, and low rate state, learned level B;

f) said microprocessor writes the "learned" state levels, levels A and B, to a separate memory location on the microprocessor, storing said learned state levels in a learned state database;

g) said microprocessor enters a sleep mode wherein it only checks current draw on a periodic basis to determine if level A or B is present; in this "sleep" mode the mains power is turned on periodically for very short time periods to ascertain whether the current draw levels are one of the two "learned" states;

i) if a high current state, level A, is determined, inventive controller device enables full power under constant microprocessor monitoring to determine when the invention reaches the low current draw state;

ii) When the low current state, level B, is determined the microprocessor turns primary power OFF, interrupts mains power, and re-enters "sleep" mode;

h) if during step g) above, said microprocessor determines that the current draw is representative of neither learned level A or level B, then steps a) e) are repeated and a new set of levels, e.g., level C and level D, are determined and set into memory per steps e) and f); this condition could represent that the charger is used for one or more different devices undergoing charging, or that a different AC adapter charger is plugged into the inventive device AC outlet; and i) during step g), the measured current draw is now compared to the pre-selected, N number, of stored-in-memory states and the charging of the "new" CED is enabled per step g) by appropriate triggering of the bidirectional triode thyristor.

13. An electrical energy conservation method as in claim 11 which includes the steps of:

a) detecting an initial application of mains power current draw by said load;

b) triggering full power to said load;

c) periodically evaluating current draw until a first step change in current draw is detected, said step change being selected from a low load draw to a high load draw, and a high load draw to a low load draw;

d) continuing to periodically evaluate said current draw until a second said step change in current draw is detected, said first and second step change comprising a cycle of step change;

e) writing said first and said second step changes as two state levels corresponding to high current state level and low current state level to a memory structure in a controller microprocessor;

f) continuing to periodically evaluate said current draw to detected a pre-selected, N-number of said cycles of step changes;

g) calculating the average of the high current and low current state levels;

h) storing said average state levels as learned state levels, high and low set points in a database structure of said microprocessor;

i) after said N-number of cycles, entering said microprocessor into a reduced power, sleep mode, during which the microprocessor is awakened in accord with a timing signal from said microprocessor clock, to sample the current draw; and j) where said sampled current draw equals or exceeds said high set point returning to said sleep state, and where said sampled current draw equals or is below said low set point, providing a trigger signal to enable mains power to flow.

14. An electrical energy conservation method as in claim 13 wherein said pre-selected N-number of cycles ranges from 2 to about 10.

15. An electrical energy conservation method as in claim 14 wherein said current draw sampling occurs at periods in the range of from about 1 to about 15 minutes.

16. An electrical energy conservation method as in claim 11 which includes the steps of automatically learning said AC adapter charger's unique charging signature, subsequently sensing when said CED battery is being charged or not, and automatically enabling mains current to flow only when said CED battery requires being charged.

* * * * *